United States Patent [19]
Urakami et al.

[11] Patent Number: 5,319,654
[45] Date of Patent: Jun. 7, 1994

[54] PULSED LASER BEAM SOURCE DEVICE

[75] Inventors: Tsuneyuki Urakami; Shinichiro Aoshima; Isuke Hirano, all of Hamamatsu, Japan

[73] Assignee: Hamamatsu Photonics K.K., Hamamatsu, Japan

[21] Appl. No.: 39,763

[22] Filed: Mar. 30, 1993

[30] Foreign Application Priority Data

Apr. 1, 1992 [JP] Japan .................. 4-079866

[51] Int. Cl.⁵ .................. H01S 3/30
[52] U.S. Cl. .................. 372/7; 372/25; 372/98
[58] Field of Search .......... 372/7, 10, 18, 25, 30, 372/98

[56] References Cited

U.S. PATENT DOCUMENTS 4,984,244  1/1991  Yamamoto et al. .......... 372/45

FOREIGN PATENT DOCUMENTS 0541304  5/1993  European Pat. Off. .
WO8503171  7/1985  PCT Int'l Appl. .

OTHER PUBLICATIONS

Zhang et al., Gallium arsenide: A new material to accomplish passively mode-locked Nd:YAG laser, Applied Physics, vol. 60, No. 4, Jan. 27, 1992, pp. 419-421.
Keller et al., Solid-state low-loss intracavity saturable absorber for Nd:YLF lasers: an antiresonant semiconductor Fabry-Perot saturable absorber, Optics Letters, vol. 17, No. 7, pp. 505-507, Jan. 1992.

Primary Examiner—Rodney B. Bovernick
Assistant Examiner—Robert E. Wise
Attorney, Agent, or Firm—Cushman, Darby & Cushman

[57] ABSTRACT

An object of this invention is to provide a pulsed laser beam source device which is easy to handle and is operative stably. Pumping light is irradiated to a laser medium from a light source for optical pumping. The stimulated laser medium pumps radiation of a set wavelength. This radiation is stimulated to be amplified while reciprocating between resonator mirrors. A multi layer film is inserted in an optical path of the radiation. Feeble light of the radiation from the laser medium is absorbed by the multi-layer to be weaker, and that part of the radiation having intensities above a set intensity is compressed in terms of time to be emitted outside. The emitted radiation has a very short pulse duration.

10 Claims, 6 Drawing Sheets

PULSED LASER BEAM SOURCE DEVICE

BACKGROUND OF THE INVENTION

1. Field of the Invention

This invention relates to a pulsed laser beam source device including a multi-layer film with a non-linear transmittance or reflectivity. The specific contents of the conventional example are described in detail in "LASER HANDBOOK edit. Japanese Society of Laser Gakkai" (published by Ohmu-sha in Japan).

2. Related Background Art

Conventional pulsed laser beam source devices for generating short pulsed beams use saturable absorbers for passive mode locking.

SUMMARY OF THE INVENTION

The pulsed laser beam source device according to this invention comprises a laser medium; optical pumping means for pumping the laser medium; resonator means for resonating a beam from the laser medium which is along a set optical path; and a multi-layer film formed of a first layer of a first material, and a second layer of a second material, the first material changing a refractive index in accordance with an intensity of the beam.

In this invention, a multi-layer film may be formed of two or more layers of two or more kinds of materials with different refractive indexes.

In the pulsed laser beam source device according to this invention, refractive indexes of materials forming the layers of the multi-layer film change depending on intensities of the incident beams. In accordance with their changed refractive indexes, transmittances or reflectivities of the films of the multi-layer film change. By using this, pulsed laser beams of ultra-narrow pulse widths can be obtained on the same principle as the passive mode-lock.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENTS

Figure 1:
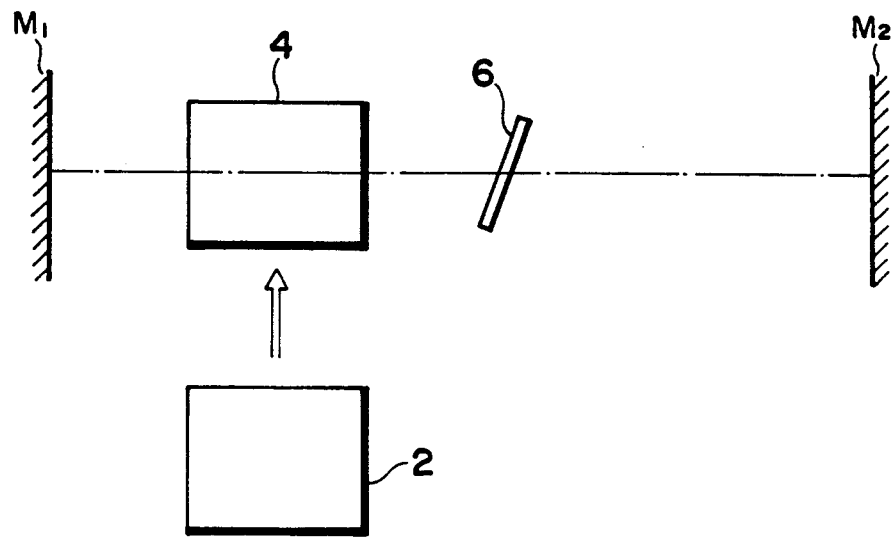
FIG. 1 is a block diagram of the pulsed laser beam source device according to the first embodiment.

FIG. 1 is a block diagram of the pulsed laser beam source device according to a first embodiment of this invention.

To be specific, a pumping light is applied to a laser medium 4 from a light source for optical pumping 2 to excite the laser medium 4. The radiation from the laser medium 4 is fed back to the laser medium 4 by a pair of resonator mirrors $M_1$, $M_2$ to stimulate the active materials in the laser medium 4 to emit a stimulated laser beam of a required wavelength.

A multi-layer film 6 is positioned on a optical path interconnecting the laser medium 4 and the resonator mirror $M_2$. The multi-layer film 6 is a little inclined from 90° with respect to the optical path. This multi-layer film 6 has a laminar structure of alternate two different kinds of layers as has a dielectric multi-layer reflecting mirror. In the multi-layer film 6, however, refractive indexes of the layers of two kinds change depending on intensities of incident light thereon. That is, when light whose intensity changes is incident on the multi-layer film 6, a transmittance (reflectivity) of the multi-layer film 6 change depending on intensities of the light. For example, the multi-layer film 6 is designed using materials which allow, in the absence of incident light, a refractive index of one of the two kinds of films to be lower than that of the other, and, in the presence of incident light, the lower refractive index of the former film to be equal to that higher refractive index of the latter film. The thus-designed multi-layer film 6 has transmittance which is raised by the incidence of the light.

The operation of the pulsed laser beam source device of FIG. 1 will be explained. The radiation from the pumped laser medium 4 is amplified by the stimulation while reciprocating between the resonators $M_1$, $M_2$ and becomes a laser beam. Because of the multi-layer film 6 positioned inserted in the optical path, that of the beam from the laser medium 4 which is feeble is reflected astray from the optical axis of the resonators to be a loss. As the beam increases its intensity, the multi-layer film 6 increases its transmittances, which contributes to the laser oscillation. Eventually a pulse of the beam is restricted automatically in the resonators, and the beam can have a very short pulse duration.

Figure 2:
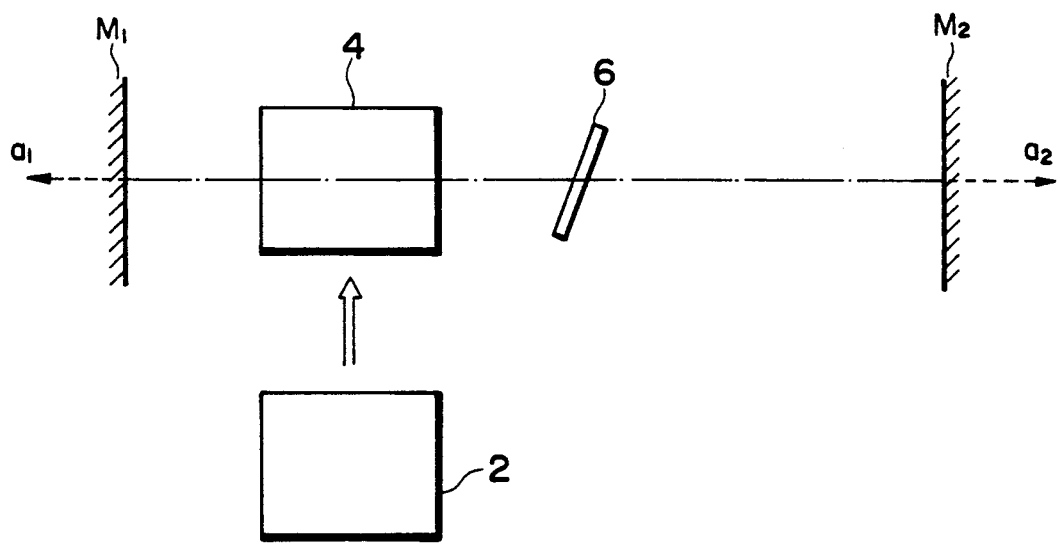
FIG. 2 is a block diagram for explaining outputting means.

Means for outputting outside the thus-generated pulsed laser beam is shown in FIG. 2. This means will be briefly explained.

In the pulsed laser beam source device of FIG. 1, in the case that the resonator mirrors $M_1$ ($M_2$) is partially light transmitting, the output beam indicated by the broken lines a1 (a2) is obtained.

The design of the multi-layer film 6 will be briefed below.

The phenomenon that a refractive index changes depending on a light intensity is determined by a third-order non-linear susceptibility (non-linear index coefficient) $\chi^{(3)}$. A refractive index n of mediums is expressed by $$n = n_c + n_v I$$

where $n_c$ represents a refractive index of the medium independent of a light intensity, and $n_v$ represents a constant for changes of a refractive index of the medium in proportion with an light intensity I.

When $n_v$ is expressed by $\chi^{(3)}$, $$n_v[cm^2/W] = 16\pi^2 \cdot \chi^{(3)}[esu]/(c \cdot n_c^2) \times 10^7 \quad (1)$$

is given. c represents a light velocity ($3 \times 10^{10}$ cm/s). As seen from the equation (1), the use of a medium with a high $\chi^{(3)}$ greatly changes a transmittance (or reflectivities) of the multi-layer film 6.

Organic thin films as the high $\chi^{(3)}$-medium are exemplified by polydiacethylene (PDA):$850 \times 10^{-12}$ [esu]
polyacethylene:$400 \times 10^{-12}$ [esu].

Materials of the organic thin film are diacetylene-based compound polymers, polyolefine-based compound polymers, liquid crystal high molecules comprising poly(-vinyl fluoride), etc. doped with dyes. The materials are specifically exemplified by, in addition to the above-described two kinds, polysilane, polyarylene vinylene, polyparaphenylene vinylene, polybenzothiazole, etc. Other main high $\chi^{(3)}$-organic thin films are detailed in "Parity", Vol. 04, No. 12, 1989-12. When $n_v$ is computed by the equation (1) with $n_c = 1.5$, polydiacetylene (PDA) has $$\begin{aligned}
n_v &= 16\pi^2 \cdot 850 \times 10^{-12}/(3 \times 10^{10} \times 1.5^2) \times 10^7 \\
&= 2.0 \times 10^{4-12+7-10} \\
&= 2.0 \times 10^{-11} [cm^2/W], \text{ and}
\end{aligned}$$

polyacetylene has $$n_v = 9.4 \times 10^{-12} [cm^2/W].$$

Here is simulated a change of a refractive index for a case where pulsed laser beam with an 100 mW-average light intensity, a 1 ps-pulse width and a 100 MHz-recurrence is incident on the these mediums. The peak power of the incident beam is $$100[mW] \times 10^{-8}[sec]/10^{-12}[sec] = 1[kW].$$

It is more effective to condense by lenses the beam entering the multi-layer film for the increase of its power density.

Figure 3:
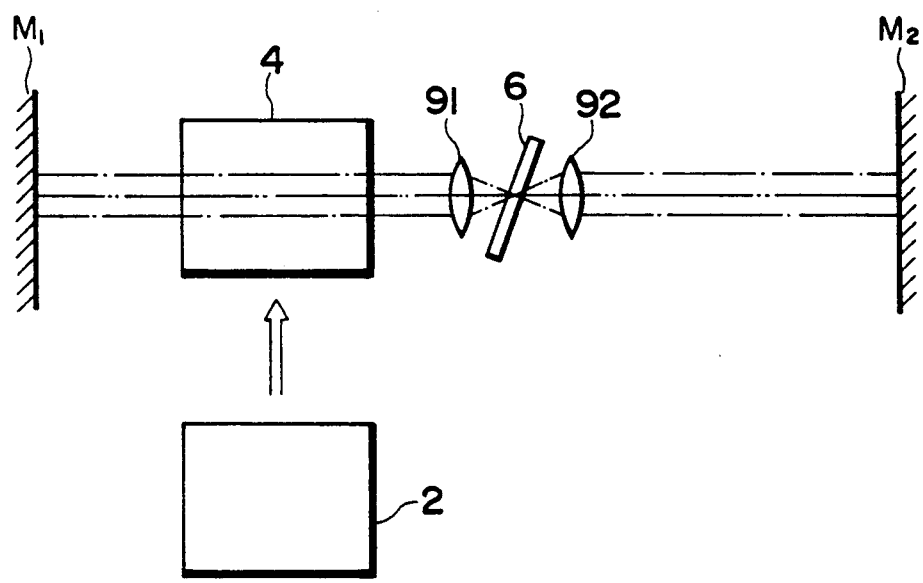
FIG. 3 block diagram of the pulsed laser beam source device further comprising lens.

A modification of the first embodiment is shown in FIG. 3. This modification includes, in addition to the members of FIG. 1, lenses 91, 92 inserted in the optical axis with the multi-layer film 6 inbetween. In this arrangement, when the condensation is, e.g., 10 $\mu m\Phi$, a refractive index change $n_v I$ of PDA is expressed by $$\begin{aligned}
n_v I &= 2.0 \times 10^{-11}[cm^2/W] \times 10^3[W]/\{(5 \times 10^{-4})^2 \times \pi[cm^2]\} \\
&= 2.0 \times 10^{-11} \times 10^3/\{78.5 \times 10^{-8}\} \\
&= 2.5 \times 10^{-2}.
\end{aligned}$$

Thus it is shown that in the case where one of the film materials is PDA, when the beam with the above-described conditions is incident, it is possible to cause a refractive index change of about $2.5 \times 10^{-2}$.

Next is simulated a case where the multi-layer film is formed of PDA with a refractive index of 1.5 and a different film material with a refractive index of 1.525, and has a layer number of 2N = 400.

Figure 4:
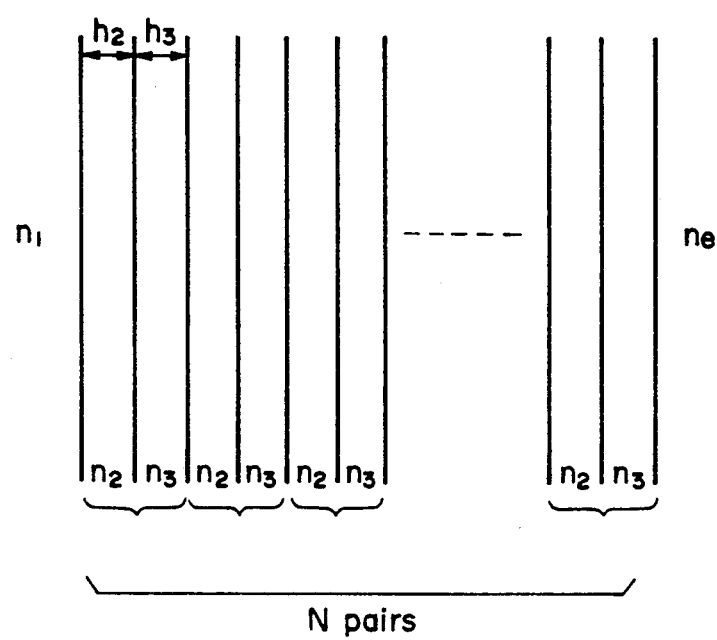
FIG. 4 is a block diagram of the multi-layer film.

FIG. 4 shows a structure of the multi-layer film 6. Here it is assumed that an incident beam on the multi-layer film 6 has a $\lambda$-wavelength, an optical thickness of a layer with a refractive index $n_2$ is $n_2 h_2 = \lambda/4$, and an optical thickness of another layer with a refractive index $n_3$ is $n_2 h_3 = \lambda/4$. The reflectivity and the transmittance of the multi-layer film of FIG. 4 is Reflectivity $R =$ $$[\{1 - (n_e/n_1) \cdot (n_2/n_3)^{2N}\}/\{1 + (n_e/n_1) \cdot (n_2/n_3)^{2N}\}]^2$$

Transmittance $T = 1 - R$.

Here, $n_1 = n_e = 1$, $n_2 = 1.525$, and $n_3 = 1.500$. And $n_3$ increases to be close to $n_2$ depending on intensity of incident light.

Figure 5:
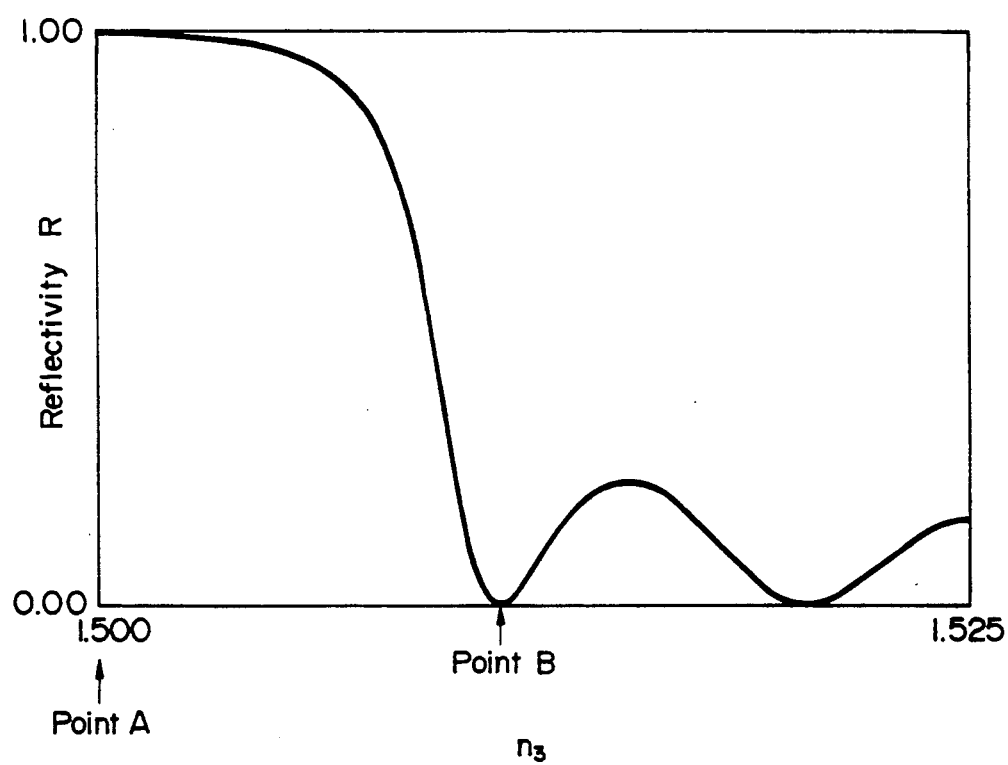
FIG. 5 is a graph of the reflection characteristic of the multi-layer film.

FIG. 5 is a graph of the reflection characteristic of the multi-layer film of FIG. 4. $n_3$ is a parameter. As seen from the graph, this multi-layer film is used, the pulsed laser beam source device of FIG. 1 is used, and the device is operated between Point A and Point B, whereby the transmittance rises as an intensity of the beam incident on the multi-layer film increases. That is, this multi-layer film can be used equivalently to a medium whose loss decreases as an intensity of incident beam increases. This multi-layer film is considered to be a effective device in pulsed laser oscillation.

As a material of the multi-layer film 6, semiconductor doped glass may be used. Since semiconductor doped glass has a third-order non-linear susceptibility $\chi^{(3)}$ of about $1^{-2} \sim 10^{-3}$ [esu], the multi-layer film of semiconductor doped glass can further lower a light density of the incident beam on the multi-layer film, and a number of the films can be reduced.

The semiconductor doped glass which has a higher susceptibility $\chi^{(3)}$ as a material of the multi-layer film is SiO$_2$, Si, or others, doped with an additive, e.g., CuCl, CuBr, CdTe, CdSe or others.

Another material with a lower susceptibility $\chi^{(3)}$ constituting the multi-layer film in a pair with the material with a higher susceptibility $\chi^{(3)}$, that is, the another material with substantially linear susceptibility with respect to light intensity, is exemplified by SiO$_2$, Si, ZnS, MgF, NaF, BaF$_2$, As$_2$S$_3$, SrF$_2$, ThF$_4$, CaF$_2$, PbF$_2$, AgCl, etc. These materials as the main components are doped with conventionally known additives for changing reflectivities to obtain thin films with required reflectivites.

Cases where organic materials, semiconductor doped glass, etc. are used as materials of the multi-layer film involve the problem of a relaxation time (response time) of the materials. That is, the use of materials with shorter relaxation times of the susceptibility $\chi^{(3)}$ is more effective for shorter-pulsed oscillation.

Figure 6:
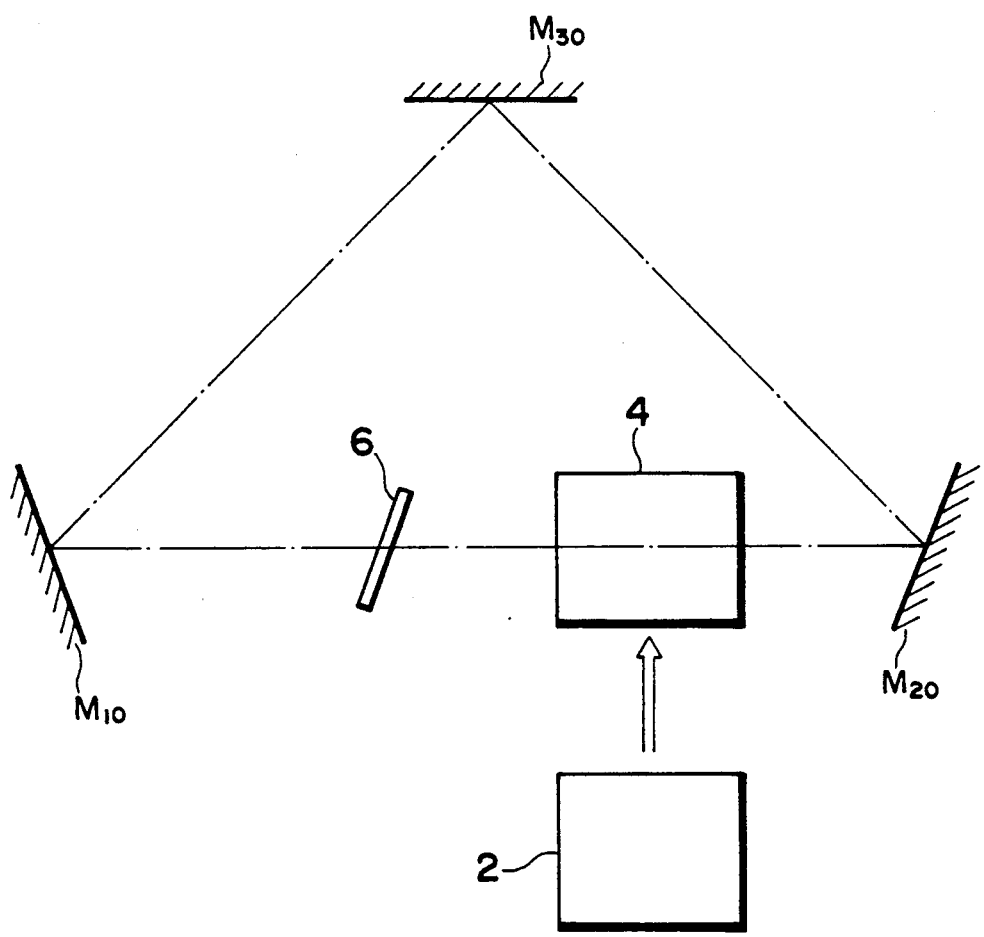
FIG. 6 is a block diagram of the pulsed laser beam source device according to the second embodiment of this invention.

FIG. 6 shows a structure of the pulsed laser beam source device according to a second embodiment of this intention. The pulsed laser beam source device according to the second embodiment has a ring-shaped resonator structure (ring cavity). The ring-shaped resonator includes three resonators mirrors M$_{10}$, M$_{20}$, M$_{30}$. the same light source for optical pumping 2, laser medium 4, etc. as in the first embodiment are used. It is preferable that a distance between the multi-layer film of this embodiment and the laser medium is ¼ a cavity length.

Figure 7:
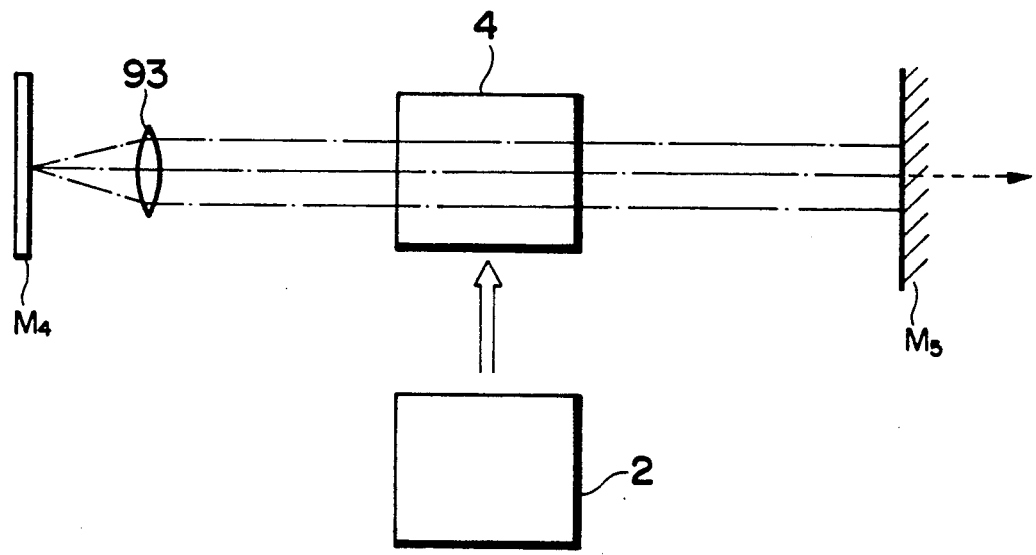
FIG. 7 is a block diagram of the pulsed laser beam source device according to the third embodiment of this invention.

FIG. 7 shows the pulsed laser beam source device according to a third embodiment of this invention. In the pulsed laser beam source according to the third embodiment, the same pulsed laser beam source 2 and laser medium 4 as in the first embodiment are used, and the multi-layer film M₄ functions as one of a pair of resonator mirrors. This pulse laser beam source device may further comprise a lens 93 inserted in the optical axis. Therefore, it is more effective to condense by this lens 93 the beam entering the multi-layer film M₄ for the increase of its power density. Of course, the lens 93 may be omitted from the pulse laser beam source device.

A pair of resonator mirrors is constituted by the multi-layer film M₄ and an output mirror M₅. As in the first embodiment, the multi-layer film M₄ is formed of two different kinds of layers alternately laid one on another. A refractive index ratio of the two kinds of layers changes depending on an intensity of the incident beam. But in the multi-layer film M₄, the two kinds of layers have substantially the same refractive index in the absence of incident beam, and in the presence of incident beam, a refractive index of one of the layers greatly changes. Eventually the multi-layer film M₄ lowers its reflectivity with respect to feeble incident beam, with the result of larger reflection loss, and with respect to incident beam of high intensities the multi-layer film M₄ lowers its reflectivity, with the result of smaller reflection loss. The use of this reflectivity characteristic of the multi-layer film M₄ enables only beam of high intensities from the laser medium 4 to be oscillated, and pulsed laser oscillation can be obtained.

Figure 8:
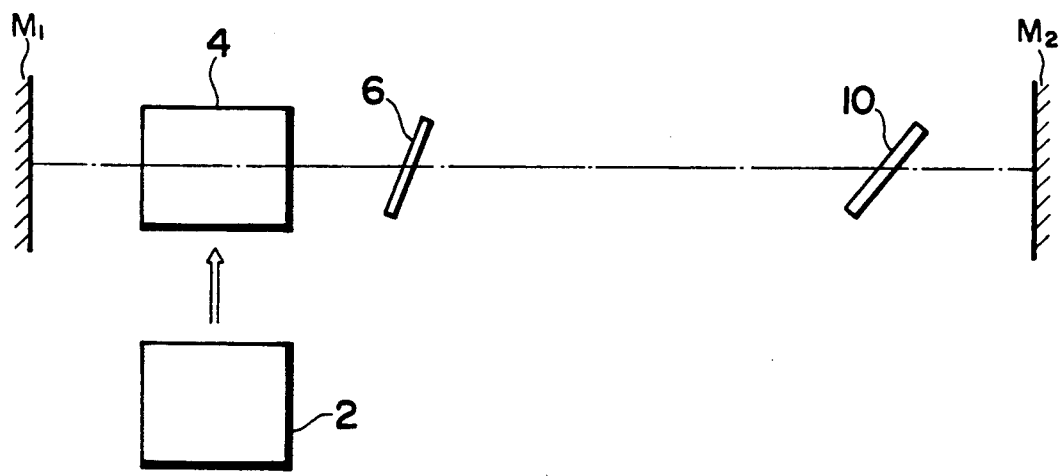
FIG. 8 is a block diagram of the pulsed laser beam source device according to the fourth embodiment of this invention.

FIG. 8 shows a fourth embodiment of this invention. The fourth embodiment further comprises a dye jet 10 inserted in the optical axis in the first embodiment. The provision of condensation lenses sandwiching the dye jet 10 can further improve the efficiency. The dye jet 10 is conventionally known. According to the pulsed laser beam source device according to this embodiment, the multi-layer film 6 and the dye jet 10 can synergetically generate pulsed laser beam with shorter pulse durations.

Here the relationships between the oscillation wavelength λ of the laser beam, and film thicknesses of the respective layers of the multi-layer film will be explained. The layer thicknesses of the respective layers are represented by $h_2$, $h_3$, and reflectivities of the respective layers are represented by $n_2$, $n_3$. It is preferable that the multi-layer films of the first and the second embodiments satisfy the condition $$n_2 h_2 = n_3 h_3 = \lambda/4$$

when an incidence intensity is low. When this condition is satisfied, the multi-layer film can efficiently reflect light (beam) with low incidence intensities and can efficiently transmit light (beam) with high incidence intensities.

It is preferable that the multi-layer film of the third embodiment satisfies the condition $$n_2 h_2 = n_3 h_3 = \lambda/4$$

when an incidence intensity is high. When this condition is satisfied, the multi-layer film can efficiently reflect light (beam) when the incidence intensity is high and can efficiently transmit light (beam) when the incidence intensity is low.

These conditions are for a case in which the beam is perpendicularly incident on the multi-layer film. In a case in which the beam is not perpendicularly incident on the multi-layer film, the layer thicknesses satisfying the above-described conditions are effective layer thicknesses which are optical distances corresponding to incident angles. That is, a positional angle of the multi-layer film with respect to the optical axis can be adjusted to change a virtual layer thickness, with the result that the multi-layer film is applicable to laser beams whose wavelengths are variable.

A frequency (f) of a pulse is determined by a cavity length. For example, in the first embodiment, a frequency ($f = 1/a$ recurrence period) of a pulse is represented by $f = c/2L$ where an optical distance between the resonator mirrors $M_1$, $M_2$ is indicated by L, and a light velocity is denoted by c. To be specific, with a cavity length L of 3 [m], $$f = 3 \times 10^8 [m/sec]/2 \times 3 \ [m] = 50 \ [MHz].$$

In the case of the second embodiment, which includes the ring cavity, $f = c/L'$ when an optical distance of one period is L'. To be specific, with a cavity length L' of 3 [m], $$f = 3 \times 10^8 [m/sec]/3[m] = 100 \ [MHz].$$

The pumping light may be pulsed light or continuous wave light. In a case that the pumping light is pulsed light, it is preferable that a frequency of a pulse of the pumping light is a multiple of an integer or a fraction of an integer.

It is possible to dispose extra means for selecting pulsed light (e.g., a cavity damper) for selecting required pulsed light out of a train of pulses. That is, a frequency can be varied.

This invention is not limited to the above-described embodiments. For example, the third embodiment may have the multi-layer film deposited directly on the laser medium.

As the laser medium, conventionally known various mediums are usable.

The pulsed laser beam source device may include a mechanism (e.g., a mode locker, galvanomirror, etc.) for changing a resonating state for a CW laser oscillation being followed by a pulsed oscillation.

This invention may use a mirror formed of films having randomly different refractive indexes which are changed by incident beam, and a reflectivity is changed.

As described above, according to the pulsed laser beam source device, a transmittance or a reflectivity of the multi-layer film changes depending on intensities of the incident beams. By using this, pulsed beams whose pulse durations are extremely small can be obtained. Furthermore, this invention uses the multi-layer film for passive mode locking, which enables pulse beams to be generated easily and stably.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is

1. A pulsed laser beam source device comprising;

a laser medium;

optical pumping means for pumping the laser medium;

resonator means for resonating a beam from the laser medium which is along a set optical path; and a multi-layer film formed of a first layer of a first material, and a second layer of a second material, the first material changing a refractive index in accordance with an intensity of the beam.

2. A pulsed laser beam source device according to claim 1, wherein the multi-layer film comprises a plurality of the first layers and a plurality of the second layers which are alternately formed.

3. A pulsed laser beam source device according to claim 1, wherein the multi-layer film is provided at the middle of the optical path, inclined by a set angle with respect to the optical path, and the refractive index of the first material is lower in the absence of incident light to the first material than that of the second material, and rises in the presence of incident light to the first material.

4. A pulsed laser beam source device according to claim 3, wherein a multiple of a virtual layer thickness of the first layer corresponding to the set angle, and the refractive index of the first material is substantially ¼ of a wavelength of the beam.

5. A pulsed laser beam source device according to claim 1, wherein the resonator means is a plurality of resonator mirrors.

6. A pulsed laser beam source device according to claim 5, wherein the multi-layer device functions as one of the resonator mirrors;

the refractive index of the first material is substantially equal to that of the second material in the absence of incident light to the first material, and rises in the presence of incident light to the first material.

7. A pulsed laser beam source device according to claim 6, wherein a product of a layer thickness of the first layer, and the refractive index of the first material in the presence of an incident beam of a set intensity is substantially ¼ of a wavelength of the beam.

8. A pulsed laser beam source device according to claim 6, wherein the multi-layer film is deposited on end surfaces of the laser medium.

9. A pulsed laser beam source device according to claim 1, further comprising a saturable absorber provided in the optical path at the middle thereof.

10. A pulsed laser beam source device according to claim 1, wherein the optical pumping means excites the laser medium in synchronization with a recurrence period of a required pulse.

* * * * *